United States Patent [19]
Wright-Ott et al.

[11] Patent Number: 5,701,968
[45] Date of Patent: Dec. 30, 1997

[54] TRANSITIONAL POWER MOBILITY AID FOR PHYSICALLY CHALLENGED CHILDREN

[75] Inventors: Christine Wright-Ott, Cupertino; John F. Wadsworth, San Francisco; Gerald R. Harris, San Bruno, all of Calif.

[73] Assignee: Licile Salter Packard Children's Hospital at Stanford, Stanford, Calif.

[21] Appl. No.: 417,060

[22] Filed: Apr. 3, 1995

[51] Int. Cl.⁶ ............................................. A61G 5/04
[52] U.S. Cl. ................. 180/65.1; 180/907; 280/650; 297/DIG. 4
[58] Field of Search ................. 180/6.5, 11, 65.1, 180/65.5, 907; 297/330, DIG. 4, DIG. 10; 280/250.1, 87.01, 87.041, 650

[56] References Cited

U.S. PATENT DOCUMENTS

| | | | |
|---|---|---|---|
| 4,078,627 | 3/1978 | Brown et al. | 180/6.5 |
| 4,399,572 | 8/1983 | Johansson | 297/DIG. 10 |
| 4,431,076 | 2/1984 | Simpson | 180/65 RT |
| 4,456,086 | 6/1984 | Wier et al. | 180/11 |
| 4,552,404 | 11/1985 | Congleton | 297/330 |
| 4,732,423 | 3/1988 | Condon | 297/DIG. 4 |
| 4,802,542 | 2/1989 | Houston et al. | 180/65.5 |
| 4,809,804 | 3/1989 | Houston et al. | 180/65.5 |
| 4,968,050 | 11/1990 | Kendrick et al. | 280/250.1 |
| 5,242,180 | 9/1993 | Bergeron | 280/250.1 |
| 5,246,240 | 9/1993 | Romich et al. | 297/DIG. 4 |
| 5,265,689 | 11/1993 | Kauffmann | 180/65.5 |
| 5,307,889 | 5/1994 | Bohannan | 180/65.5 |
| 5,618,055 | 4/1997 | Mulholland | 180/907 |

FOREIGN PATENT DOCUMENTS

| | | | |
|---|---|---|---|
| 0338689 | 10/1989 | European Pat. Off. | 180/907 |
| 776610 | 11/1980 | U.S.S.R. | 180/307 |
| 1316673 | 6/1987 | U.S.S.R. | 180/6.5 |
| 2061197 | 5/1981 | United Kingdom | 180/65.1 |

OTHER PUBLICATIONS

RUGBUG™ Motorized Safety Wheelchair for Children, Brochure from Sinties Scientific Corporation, 1989, 2 pages.
Electric Sports Wheelchair, Brochure from Dafimo, Denmark, Danish Design Index 1991, 6 pages.
Tudelft Wheelchair, Article Published in Delft Outlook 92.3, Delft University of Technology, Holland, 1992, 4 pages.
Hoveround Personal Mobility Vehicles, Brochure from Hoveround Corporation, Florida, no date, 2 pages.
Jonsport Electro, Article on variety of vehicles from Joncare of Radley Road Industrial Estate, no date, 3 pages.
Mobility Devices, Brochure on a variety of vehicles from from Rehabilitation Engineering Division, Australia, no date, 1 page.
Permobil, Article and Brochure on variety of vehicles from Permobil, Massachusetts, no date, 5 pages.
Power Strider, Brochure, no date, 3 pages.
Toro magic Walker, Brochure from Horacek gmbh, no date, 2 pages.
Turbo–Bobcat, Brochure from EverActive Limited, Cambridge, no date, 2 pages.

*Primary Examiner*—Eric D. Culbreth
*Assistant Examiner*—Frank Vanaman
*Attorney, Agent, or Firm*—Townsend and Townsend and Crew LLP

[57] ABSTRACT

A multipositioning power mobility aid for physically challenged children is provided. The power mobility aid provides a transition to a power wheelchair. The power mobility aid includes a multipositioning main frame that allows a child to be placed in a sitting, semi-standing or standing position without requiring multiple adjustments. The back support rotates to a nonsupporting position to facilitate placing a child in or removing a child from the power mobility aid. The back support then locks into an upright supporting position after the child is positioned in the power mobility aid. The power mobility aid includes an adjustable arm that supports the user-operable input device in multiple locations.

20 Claims, 12 Drawing Sheets

TRANSITIONAL POWER MOBILITY AID FOR PHYSICALLY CHALLENGED CHILDREN

This invention was made with Government support under grant funding provided by the United States Department of Education Office of Special Education and Rehabilitative Services under contract PR Number H180P00018-91. The Government may have certain rights in this invention.

BACKGROUND OF THE INVENTION

The present invention relates to mobility aids for physically challenged children and, more particularly, to a power mobility aid to help severely physically challenged children transition to conventional power mobility aids like power wheelchairs.

The early years in a child's life are critical for the full development of a child's potential. For it is during these years that children become self mobile by learning to crawl and walk. Mobility allows children to hone their motor skills, explore, and physically interact with their environment. Severely physically challenged children similarly need to hone their motor skills, explore, and physically interact with their environment, but they will need the aid of device to provide them with the requisite mobility.

Power wheelchairs are available for physically challenged children. However, power wheelchairs do not provide an adequate solution for young children for many reasons. Young children spend most of their time indoors and power wheelchairs are not easily maneuvered indoors because they are primarily designed for outdoor use. Also, power wheelchairs do not allow children to adequately explore their environment because the child is in a seated position often unable to touch their surroundings. Lastly, the cost of power wheelchairs is usually prohibitive, especially in view of the fact that the child will likely outgrow the wheelchair in a relatively short period of time.

Power wheelchairs are available for physically challenged children that have power standing seats which raise a child from a seated position to a standing position. Such power wheelchairs are available from companies such as Permobil of Woburn, Mass. However, the power standing seats of these power wheelchairs are not very well suited for very young children (e.g., under the age of five) because of the increased risk of injury. Thus, young children often have to wait until they grow older before they are provided with such a power wheelchair. While they are waiting, these children are not able to explore their environment or develop the motor skills necessary to control a power wheelchair.

What is needed is a lower cost power mobility aid for physically challenged children that allows them to explore and interact with their environment while providing a good transition to a power wheelchair.

SUMMARY OF THE INVENTION

The present invention provides a power mobility aid for physically challenged children that allows them to transition from being non-mobile to acquiring the motor skills to use a power wheelchair. A mobility aid according to the present invention is designed to operate mainly indoors and provide a way for physically challenged children to develop by exploring and interacting with their environment.

The present invention provides a mobility aid having a multipositioning frame that allows a child to be placed in a sitting, semi-standing or standing position without requiring multiple adjustments. In order to accomplish this, the trunk support, seat, and back support are mounted on a common main support frame so that they all move as one unit when a child is manually raised or lowered from one position to another. This main frame can also be removed from the power base for easy transport and other seating systems (e.g., custom seats) may be attached to the power base.

The present invention provides a back support frame that is rotatable away from the back of the child to facilitate placing the child into or removing the child from the mobility aid. The head rest and lower back pad are mounted on the back support frame which locks into an upright supporting position after a child is positioned in the mobility aid. This allows the child to be placed into or removed from the chair support from behind, which is surprisingly easier than the front as in a traditional wheelchair.

The present invention also provides user-operable input devices that are fully adjustable to numerous positions to suit the abilities of the child. The input devices that control the mobility aid may be switches, a joystick, and the like. The input device is mounted on an adjustable arm that allows the input device to be positioned where the child can best reach them depending on the child's particular disability. Additionally, a switch tray including switches may be positioned behind the head of the child to allow head movement to control the mobility aid.

A further understanding of the nature and advantages of the present invention may be realized by reference to the remaining portions of the specification and the drawings.

DESCRIPTION OF THE PREFERRED EMBODIMENT

The present invention provides a power mobility aid for physically challenged children that allows them to develop and explore while acquiring the motor skills to make a smooth transition to a power wheelchair. A mobility aid according to the present invention is designed for very young children (as young as 12 months) and is for primarily indoor use.

Figure 1:
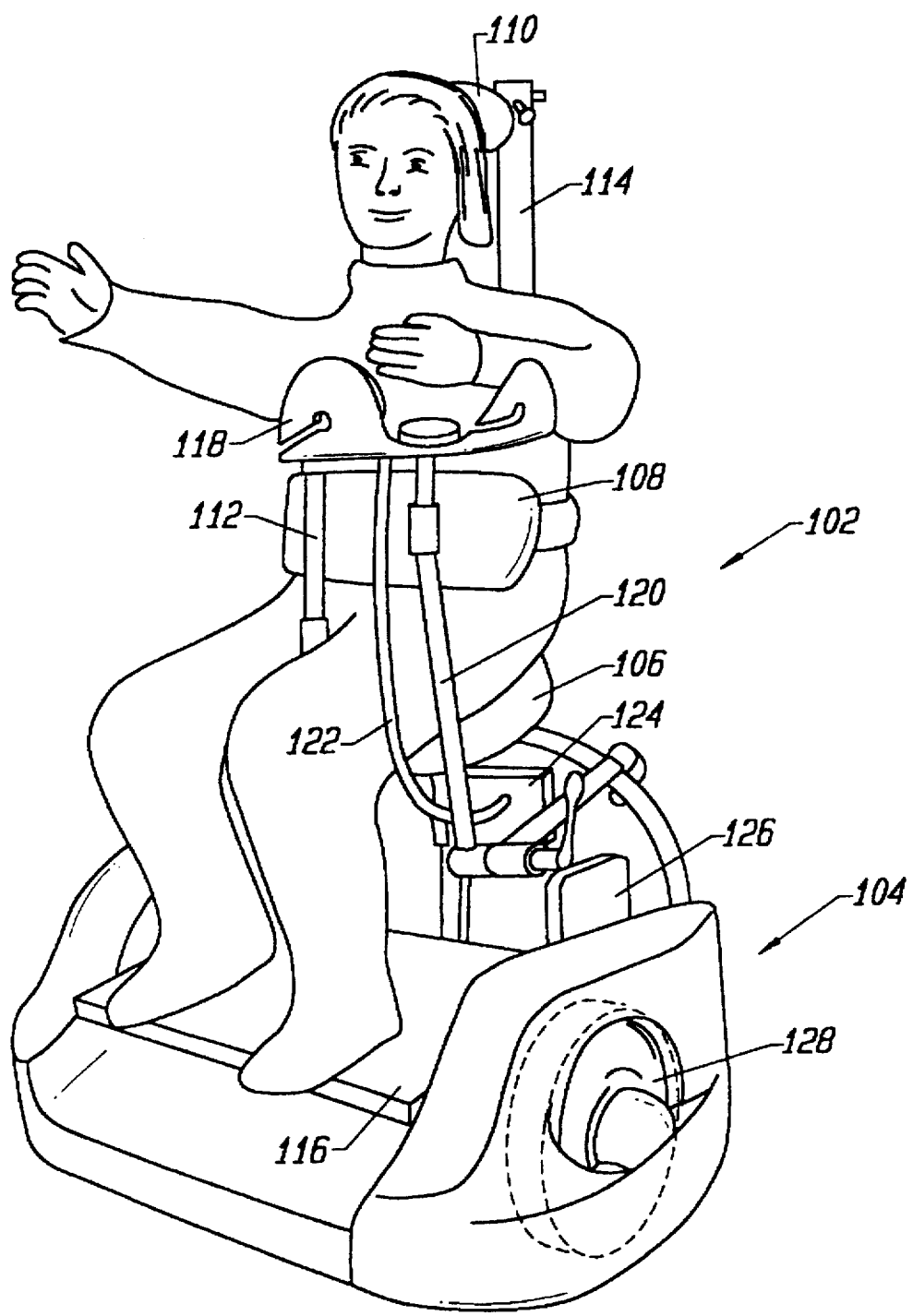
FIG. 1 is a perspective view of the power mobility aid of the present invention.

FIG. 1 shows a perspective view of the power mobility aid of the present invention. A brief description of the power mobility aid will be presented in reference to FIG. 1 with a more detailed description following in reference to the rest of the figures. A power mobility aid 102 supports a child user on a power base 104 which provides mobility to the child user. The child user sits on a seat 106 and is supported in the front by a trunk pad 108 and in the back by a head rest 110. The trunk pad is attached to a trunk pad pole 112 while the head rest is attached to a head rest pole 114. These poles function as frames supporting the trunk pad and head rest, respectively. The child user's feet are shown supported by a foot plate 116.

The child user directs the movement of the power mobility aid with an input device. As shown, the input device includes switches on a switch tray 118. The switch tray is supported in a location where the child user may easily press the switches by an adjustable arm 120. Electronic signals from the switches on the switch tray travel along a cable 122 to a controller 124. The controller is an electronics unit that receives signals from the input device and power from a battery 126 to control the application of power to a motor (not shown). The motor turns drive wheels 128 which propel the power mobility aid in the direction specified by the child user.

Figure 2:
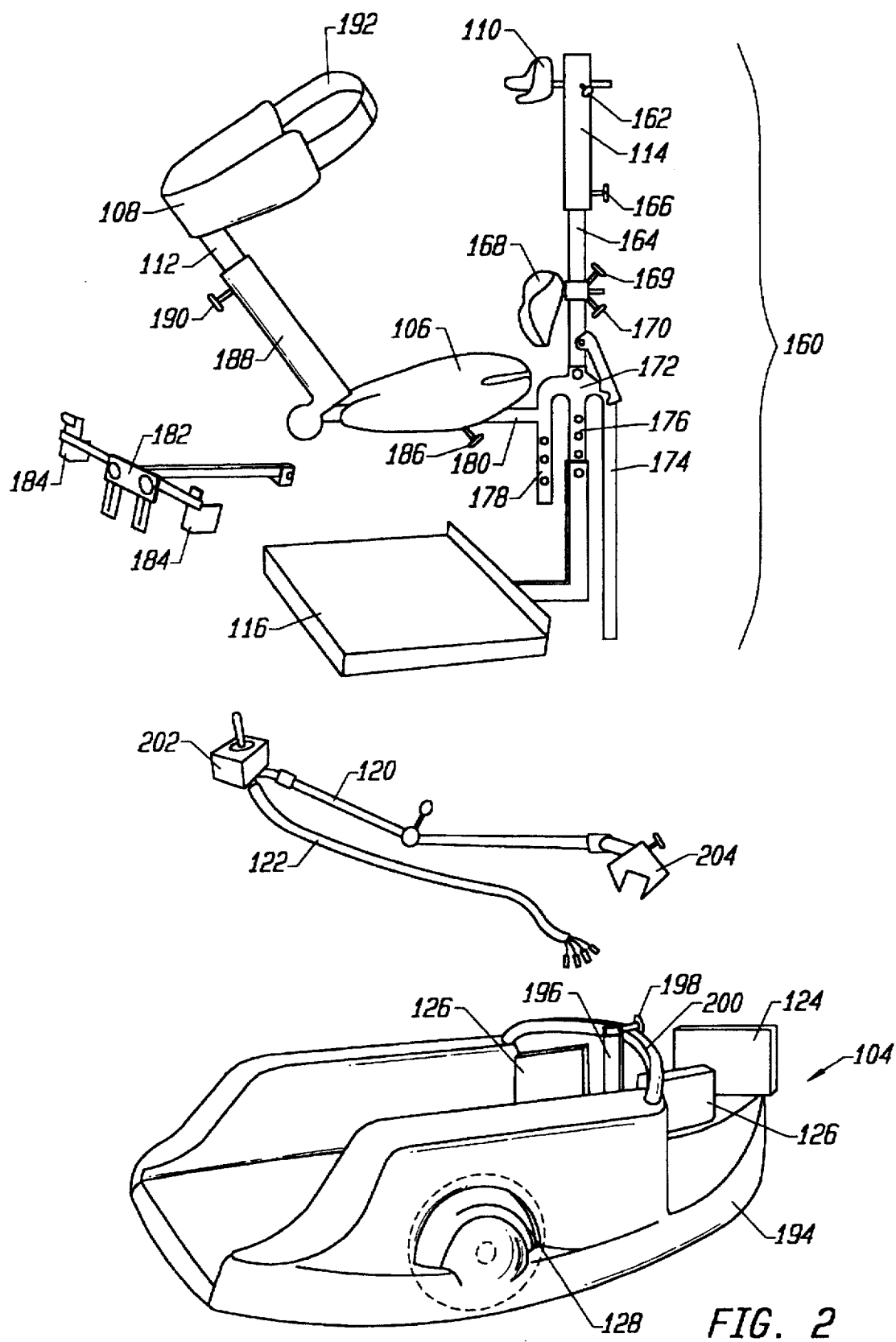
FIG. 2 is an exploded view of the power mobility aid.

FIG. 2 shows an exploded view of the power mobility aid. The child user is supported by a user support frame 160 which is shown separated from power base 104. Head rest 110 is connected to head rest pole 114 such that the head rest is capable of being moved forward and rearward (i.e., horizontally). A head rest horizontal knob 162 allows the head rest to be locked in the horizontal location best suited for the child user. The adjustment knobs of this embodiment include screws which are tightened to lock the adjustable supports in a certain location. One of ordinary skill in the art would readily recognize that other locking mechanisms may also be used. In one embodiment, the trunk pad pole is covered with a padding material.

The trunk pad pole is connected to an upper posterior support pole 164. The headrest pole is hollow with inside dimensions greater than the outer dimensions of the upper posterior support pole, thereby allowing the head rest pole to move vertically on the upper posterior support pole. A head rest vertical knob 166 is used to lock the head rest in a vertical location. In a preferred embodiment, the poles have a square cross-sectional shape so that one pole is not able to rotate in relation to the other.

A lower back pad 168 is connected to the upper posterior support pole. The lower back pad provides lumbar support to the child user and is capable of being moved horizontally. A lower back pad horizontal knob 169 allows the lower back pad to be locked in the horizontal location best suited for the child user. Additionally, the lower back pad is capable of being moved vertically along the upper posterior support pole. A lower back pad vertical knob 170 is used to lock the lower back pad in a vertical location.

The upper posterior support pole is connected to a lower posterior support frame 172. The connection of the posterior support pole and frame will be discussed in detail in reference to FIGS. 5A and 5B. The lower posterior support frame includes three downwardly extending poles 174, 176, 178, and a horizontal seat pole 180. Pole 174 is used to connect user support frame 160 to power base 104. Pole 176 contains numerous holes that receive a detent in order to lock foot plate 116 in a vertical location. Pole 178 also contains holes which are used to lock a knee support 182 in a vertical location. The knee support includes knee pads 184 which are adjustable for a particular child user.

Seat 106 is connected to seat pole 180 such that the seat is horizontally movable. A seat horizontal knob is used to lock the seat in a horizontal location. The movement of the seat will be discussed in detail in reference to FIGS. 6A and 6B. The seat pole is connected to an anterior support pole 188. In a preferred embodiment, the seat pole and anterior support pole are connected by an adjustable joint which allows the anterior support pole to be locked at multiple angles to the seat pole. The angle of the two poles should be selected to best suit the individual child user. Although the adjustable joint is not necessary, it provides greater customization for the child user.

The anterior support pole is connected to trunk pad pole 112 which is connected to trunk pad 108. The inner dimensions of the anterior support pole are larger than the outer dimensions of the trunk pad pole so that the trunk pad pole and trunk pad are capable of being moved vertically inside the anterior support pole. A trunk pad vertical knob 190 is used to lock the trunk pad in a vertical location. In one embodiment, the anterior support pole is covered in a padding material. Also, the trunk pad may include a trunk pad strap 192 which is secured around the trunk or chest of the child user.

Power base 104 includes a power base body 194 which may be composed of plastic or other similar material. The power base also has a power base pole 196 which accepts pole 176 of the user support frame. The power base pole has an inside dimension greater than the outside dimension of pole 174 so that the user support frame is capable of being moved to multiple vertical locations. A user support frame vertical knob 198 is used to lock the user support frame in a vertical location. In the embodiment shown, the power base pole is supported by a stabilizer bar 200. The stabilizer bar is connected to the power base pole to provide additional support. Although one stabilizer bar is shown, multiple stabilizer bars may be utilized. Additionally, the stabilizer bars may be used as handles for carrying the power base.

Figure 7A:
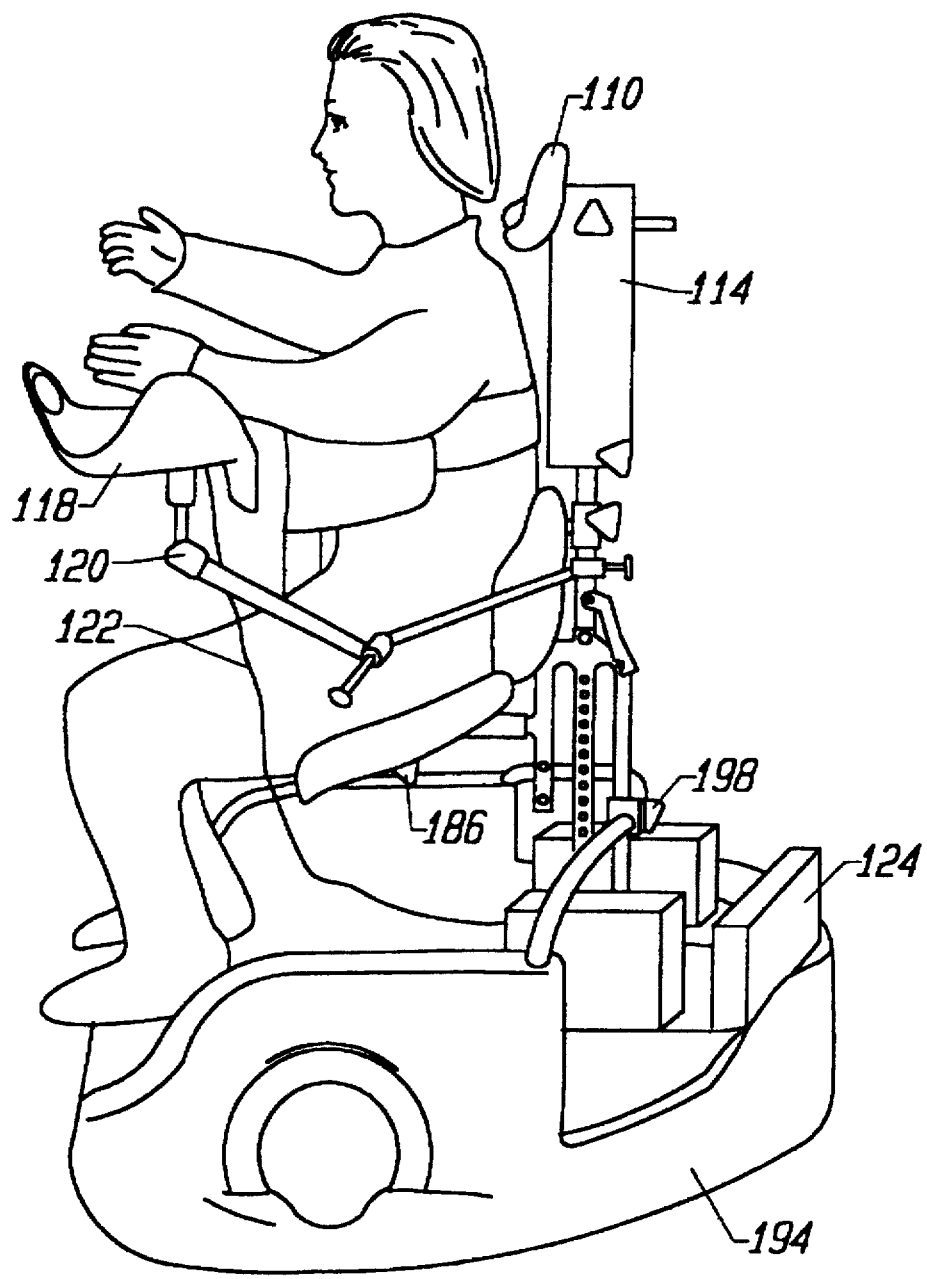
FIG. 7A is a perspective view of the power mobility aid supporting the child user in a sitting position.
Figure 7B:
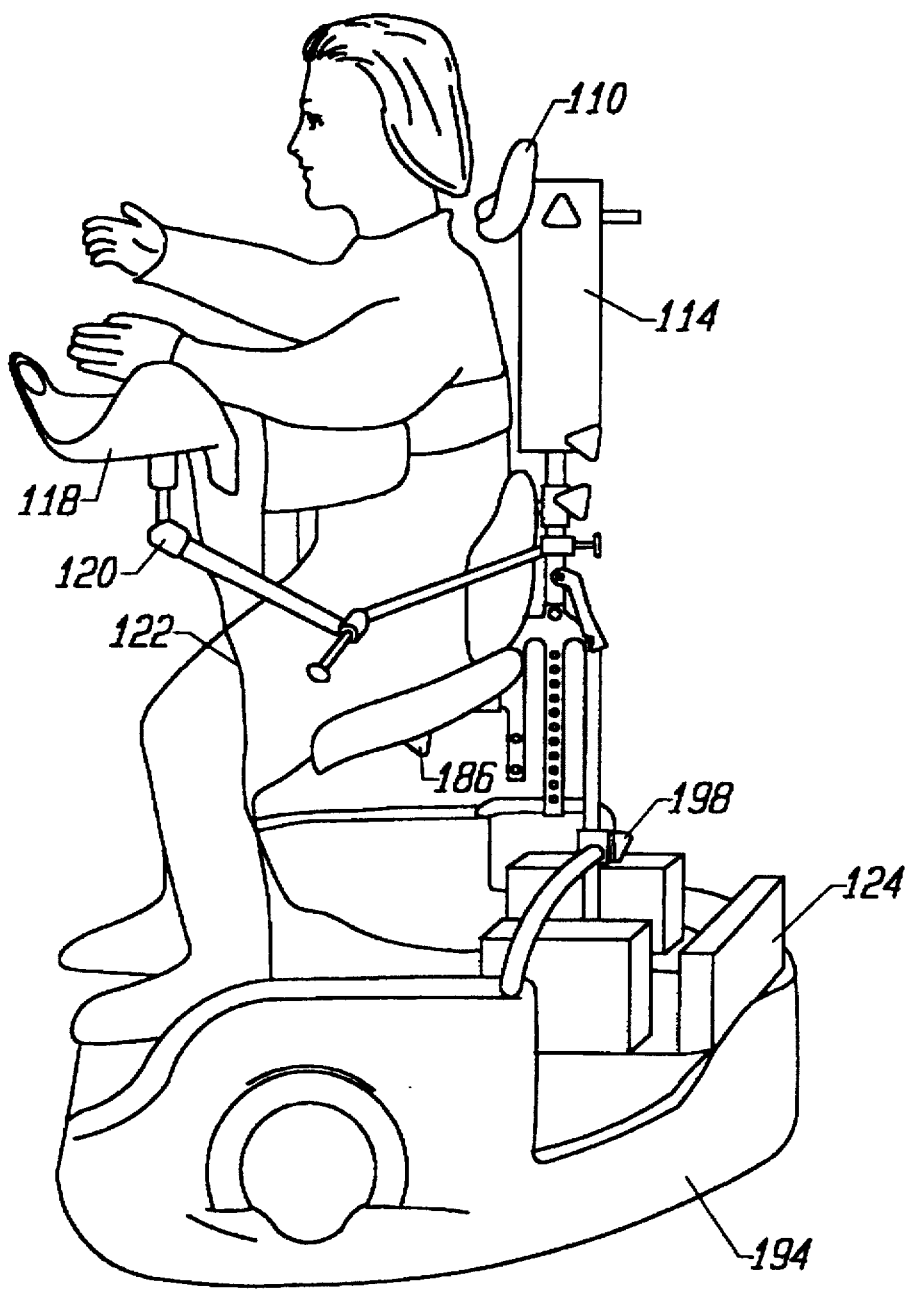
FIG. 7B is a perspective view of the power mobility aid supporting the child user in a semi-standing position.
Figure 7C:
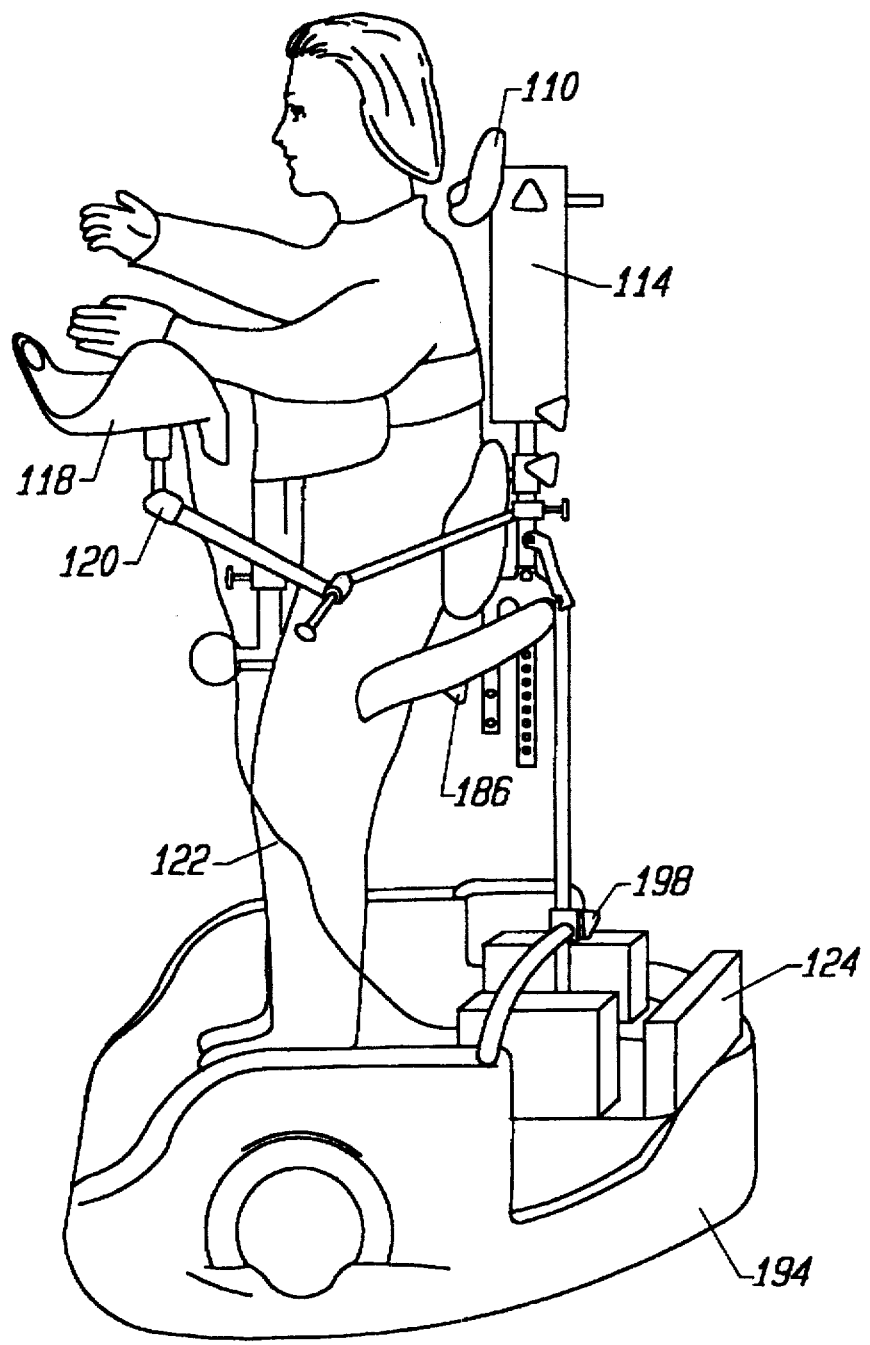
FIG. 7C is a perspective view of the power mobility aid supporting the child user in a standing position.

An important feature of the present invention is that the user support frame is connected to the power base at only one location. This allows the numerous adjustments in the user support frame, including the head rest, lower back pad, and trunk pad, to be adjusted to suit an individual child user. After the user support frame is customized for the child user, the user support frame vertical knob is used to adjust the user support frame to support the child user in multiple positions without requiring multiple adjustments. The position may be chosen to accommodate the child's environment. For example, the user support frame may be adjusted to support the child user at the right height to access a table. FIGS. 7A through 7C show the child user supported in sitting, semi-standing, and standing positions. Additionally, the user support frame may be removed from the power base for easy transport and a custom chair (not shown) can be attached to the power base.

Still referring to FIG. 2, a joystick 202 is shown connected to adjustable arm 120. The adjustable arm allows an input device, to be located in a location best suited for the child user. The input device may be a joystick, switch tray with switch, and the like. An adjustable arm that allows three joints to be adjusted by a single lever may be obtained from Manfrotto Company (part "Bogen 2934"). A clamp 204 is connected to the adjustable arm so that the adjustable arm may be attached to the power base or the user support frame. The clamp may be connected to power base 104 at the power base pole or the stabilizer bar. Preferably, the clamp is attached to one of the poles of user support frame 160 so that the input device will move with the user support frame as it is adjusted in a vertical location. The joystick is electrically connected to controller 124 by cable 122. The cable will typically include more than one wire connection.

Figure 3:
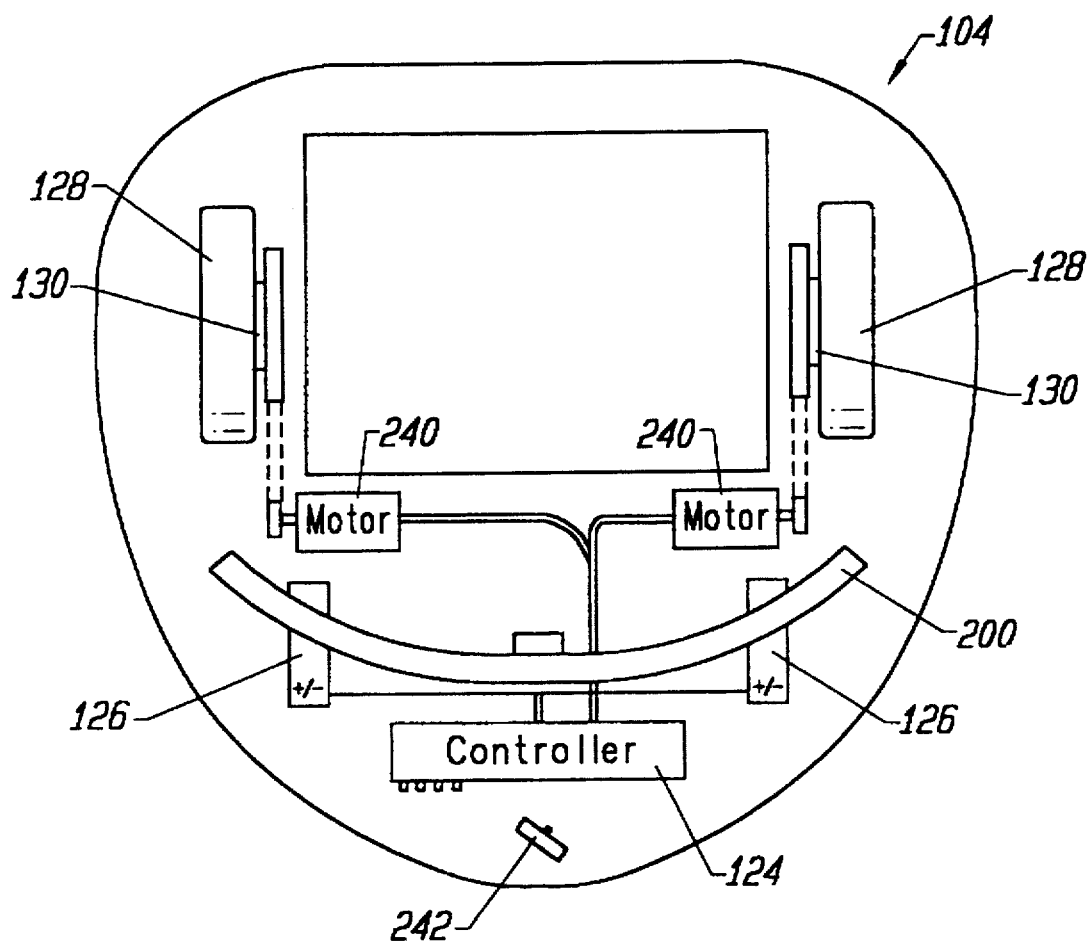
FIG. 3 is a top view of the drive components under the power base body of the power mobility aid.

FIG. 3 shows a top view of the drive components under the power base body of the power mobility aid. Power is provided to controller 124 by batteries 126. The controller receives electronic signals from the user-operable input device in response to the child user input. Although two batteries are shown, any number of batteries may be utilized to power the power mobility aid. The motors turn drive wheels 128 by the use of belts and pulleys, chains and sprockets, and the like. In a preferred embodiment, clutches 130 may be utilized to disengage a pulley from the accompanying drive wheel. Once the pulley is disengaged from the drive wheel, the power base rolls more freely. Thus, an adult uses the clutches to disengage the power drive (e.g., motors, belts and pulleys) to the drive wheels so that the power base may be more easily pushed manually. The power mobility aid also rolls on a third castered free-spinning wheel 242.

Depending on the child user input, the controller supplies a differing amount of power to the motors in order to propel the power mobility aid in the direction requested. Thus, the controller supplies an equal amount of power to both motors to propel the power mobility aid in a forward or reverse direction. For turns, the drive electronics unit supplies an unequal amount of power to the motors. Sharper turns are performed by supplying power of opposite polarity to the motors so that the motors rotate the drive wheels in opposite directions. A controller that functions as described is available from many different manufacturers including Innovative Products, 830 S. 48th St., Grand Folks, N.Dak. 58201 and Invacare Corporation, 899 Cleveland St., P.O. Box 4028, Elyria, Ohio 44036.

Figure 4A:
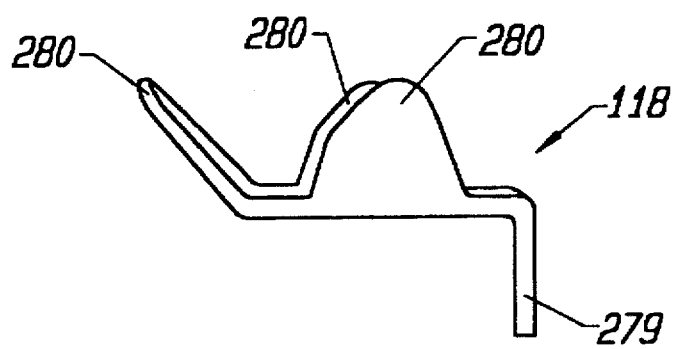
FIG. 4A is a side view of the switch tray.
Figure 4B:
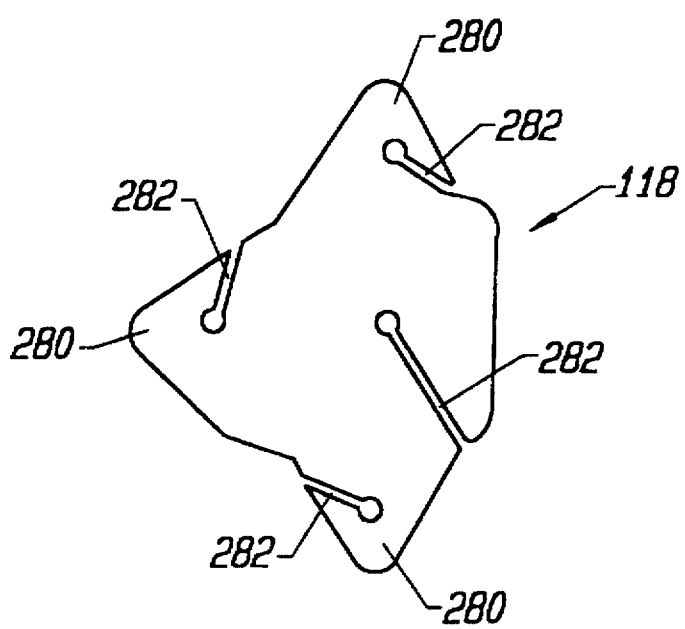
FIG. 4B is a top view of the switch tray.
Figure 4C:
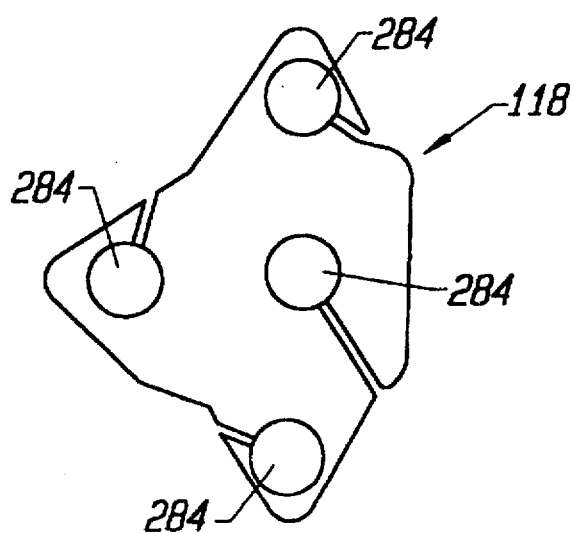
FIG. 4C is a top view of the switch tray with four switches.

FIG. 4A shows a side view of the switch tray. The switch tray includes a downwardly extending portion 279 and three upwardly-extending semicircular portions 280. FIG. 4B shows a top view of the switch tray. The switch tray is designed to hold four switches that will direct the power mobility aid in the forward, reverse, left, and right directions. One switch is located in the center of the switch tray while each of the other three switches is located on semicircular portions 280. Cutouts 282 have been made in the switch tray to allow wires from the switches to more easily pass to the other side of the switch tray. FIG. 4C shows a top view of the switch tray with four switches. Four switches 284 are shown mounted on the switch tray.

The switch tray is designed so that the switches on the switch tray may be easily manipulated by the hand of a child user. The concave shape of the switch tray also allows it to be placed behind the head of the child user so that the switches may be manipulated by movement of the head (see FIG. 8). The switch tray may be constructed of plastic or any other similar material.

Figure 4D:
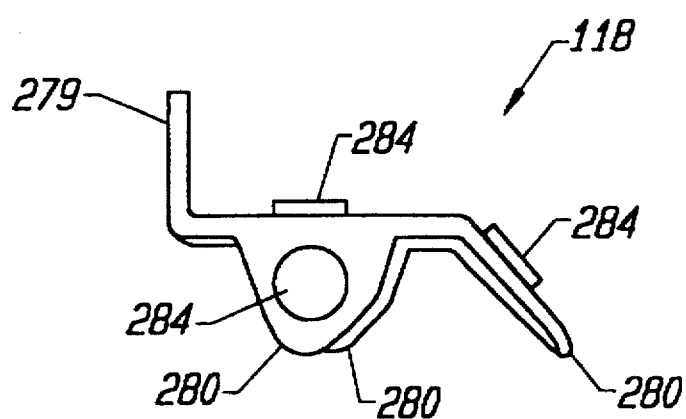
FIG. 4D shows an alternate configuration of the switch tray.
Figure 4E:
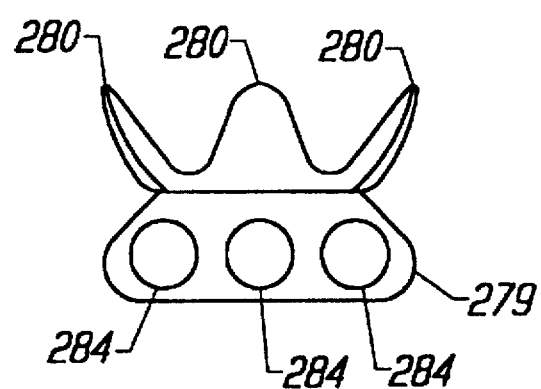
FIG. 4E shows another configuration of the switch tray.

FIG. 4D shows an alternate configuration of the switch tray. In this use, switches 284 are placed on the opposite side of the switch tray shown in FIG. 4C. FIG. 4E shows another configuration of the switch tray where three switches 284 are placed on downwardly extending portion 279. The configuration of the switch tray may be chosen to best suit the child user's abilities.

Figure 5A:
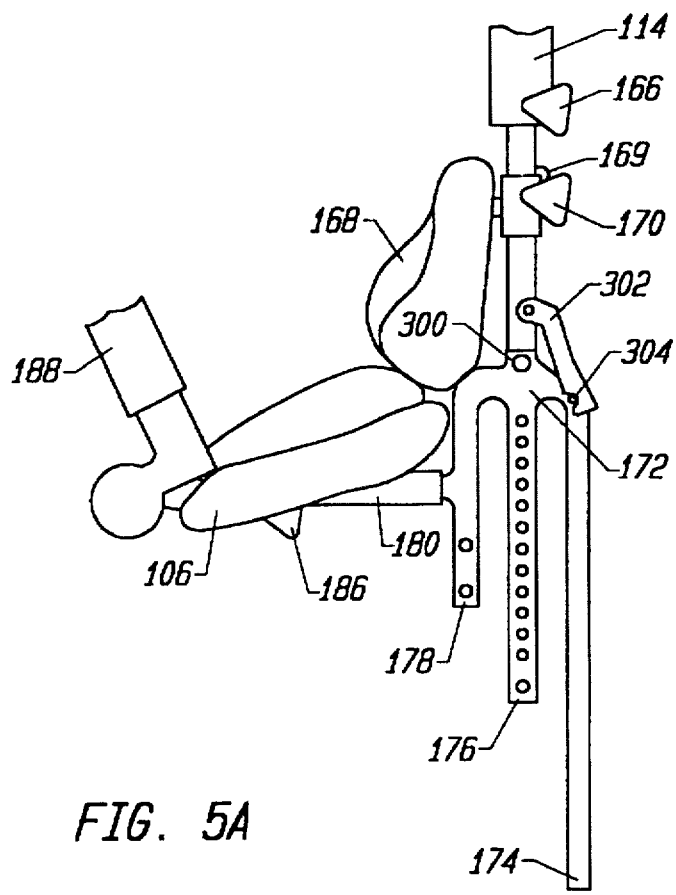
FIG. 5A is a side view of the user support frame in a supporting vertical position.

FIG. 5A shows a side view of the user support frame in a supporting vertical position. Upper posterior support pole 164 is rotatably connected to lower posterior support frame 172 at a joint 300. A support locking bar 302 is rotatably connected to the upper posterior support pole. The support locking bar has an indentation which slips around a protrusion 304 on pole 174, thereby locking the upper posterior support pole in a supporting vertical position. The upper posterior support pole will typically be locked in a vertical position when the child user is positioned in the power mobility aid.

Figure 5B:
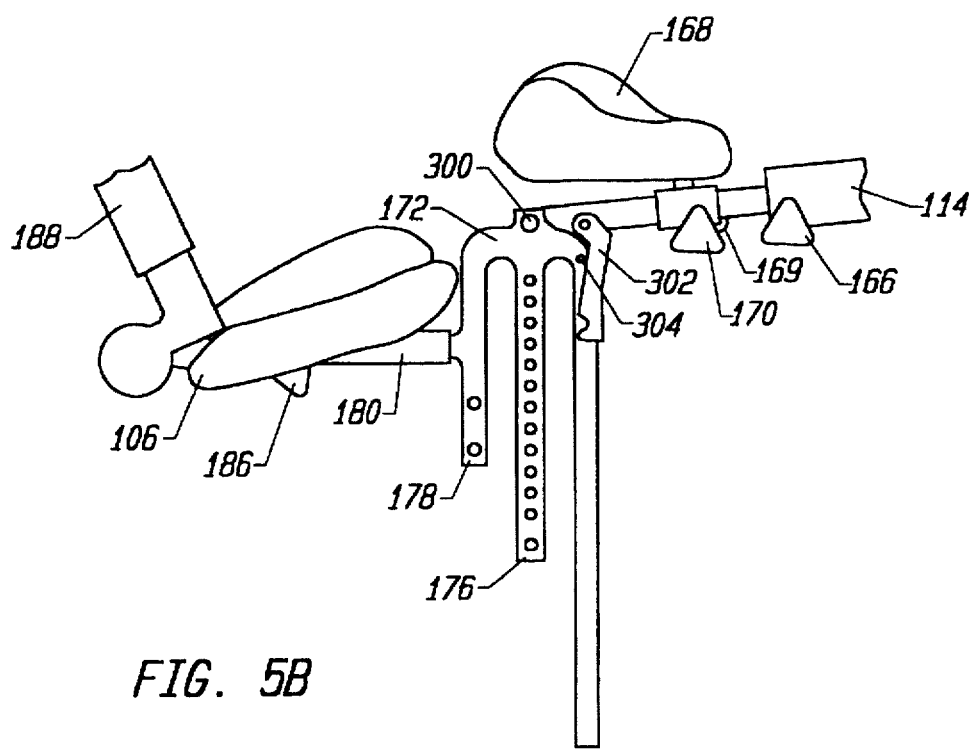
FIG. 5B is a side view of the user support frame in a nonsupporting horizontal position.

FIG. 5B shows a side view of the user support frame in a nonsupporting horizontal position. In order to assist the child user into or out of the power mobility aid, the support locking bar is lifted so that it no longer contacts the protrusion on pole 174 allowing the upper posterior support pole to fall to a nonsupporting horizontal position. The support locking bar is designed so that when the upper posterior support pole is then raised to a vertical position, the support locking bar automatically locks the upper posterior support pole in a vertical position.

Figures 6A, 6B:
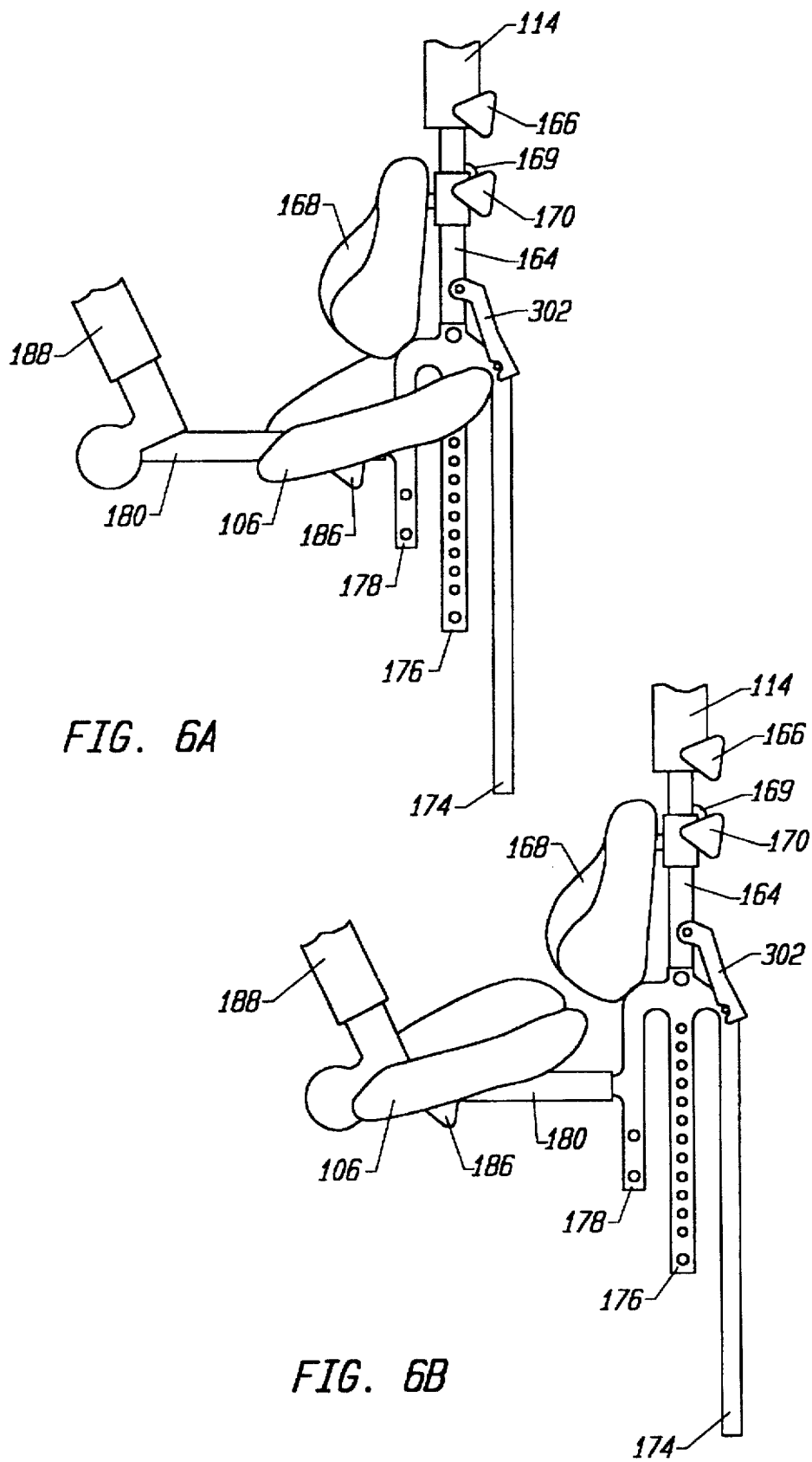
FIG. 6A is a side view of the user support frame with the seat in a rearward position for standing.
FIG. 6B is a side view of the user support frame with the seat in a forward position for sitting.

FIG. 6A shows a side view of the user support frame with the seat in a rearward position for standing. Seat 106 is designed with cutouts in the front and rear of the seat so that it is free to move horizontally along seat pole 180. When seat horizontal knob 186 is loosened, the seat may be retracted towards the rear of the power mobility aid. The rear cutout in the seat allows the seat to be retracted past the lower posterior support frame. If the seat horizontal knob is then tightened, the seat will remain in the retracted, rearward position. The rearward position provides less support for the child user but is still suitable for all positions, especially standing positions.

FIG. 6B shows a side view of the user support frame with the seat in a forward position for sitting. The seat is shown positioned toward the front of the power mobility aid with the front cutouts allowing the seat to be extended past the anterior support pole. The forward position provides greater support for the child user so it may be better suited for sitting positions.

FIGS. 7A–7C illustrate how the power mobility aid of the present invention allows the child user to be easily placed in multiple positions. FIG. 7A shows a perspective view of the power mobility aid supporting the child user in a sitting position. Adjustable arm 120 which supports switch tray 118 is connected to the upper posterior support pole so that the switch tray moves together with the user support frame. The knee support and foot plate are not always required and are not shown in FIGS. 7A–7C. If the knee and/or foot plate are utilized, they may optionally be adjusted with each new position.

FIG. 7B shows a perspective view of the power mobility aid supporting the child user in a semi-standing position. In order to move the child user from the sitting position of FIG. 7A to the semi-standing position of FIG. 7B, user support frame knob 198 is loosened and the user support frame is raised vertically with the child user typically on the power mobility aid. After the user support frame vertical knob is tightened, the user support frame is locked in the new position. Additionally, seat horizontal knob 186 may be optionally loosened and the seat is moved to a more rearward position.

FIG. 7C shows a perspective view of the power mobility aid supporting the child user in a standing position. Again, the user support frame vertical knob is loosened and the user support frame is raised vertically to support the child user in a standing position. After the user support frame vertical knob is tightened, the seat may be optionally adjusted to a more rearward position as shown. As the adjustable arm is connected to the upper posterior support pole, the switch tray moved together with the rest of the user support frame.

Figure 8:
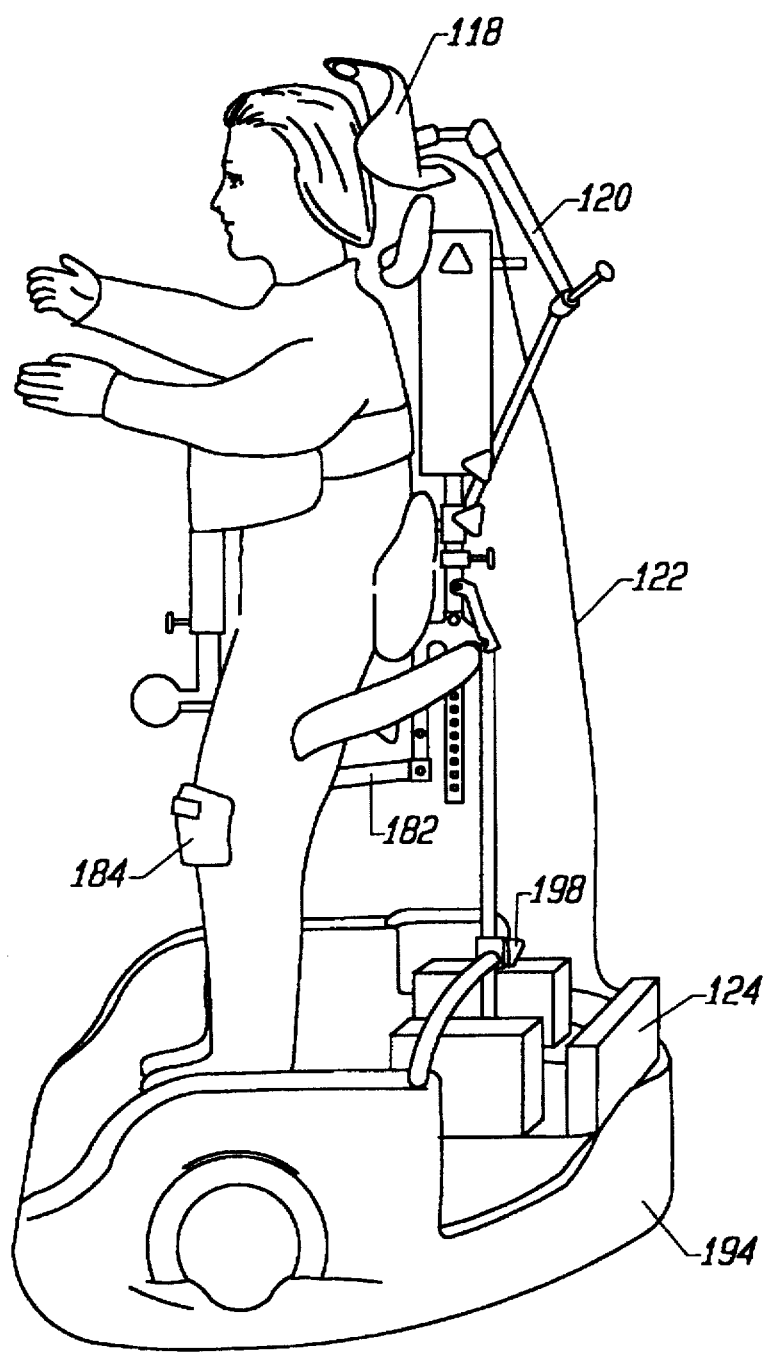
FIG. 8 is a perspective view of the power mobility aid having the switch tray located behind the child user's head.

FIG. 8 shows a perspective view of the power mobility aid having the switch tray located behind the child user's head. Some physically challenged children are more able to move their head than their hands. Therefore, the switch tray of the power mobility aid may be positioned so that the head of the child user controls the switches. Although the switch tray may be flat in some embodiments, a concave switch tray makes the switch tray also suitable for use behind the head of the child user. The adjustable arm is loosened and the switch tray is rotated behind the child user's head and then the adjustable arm is locked into place. Thereafter, the child user will be able to direct the movement of the power mobility aid using her head. FIG. 8 also shows knee support 182 connected to pole 178.

Figure 9:
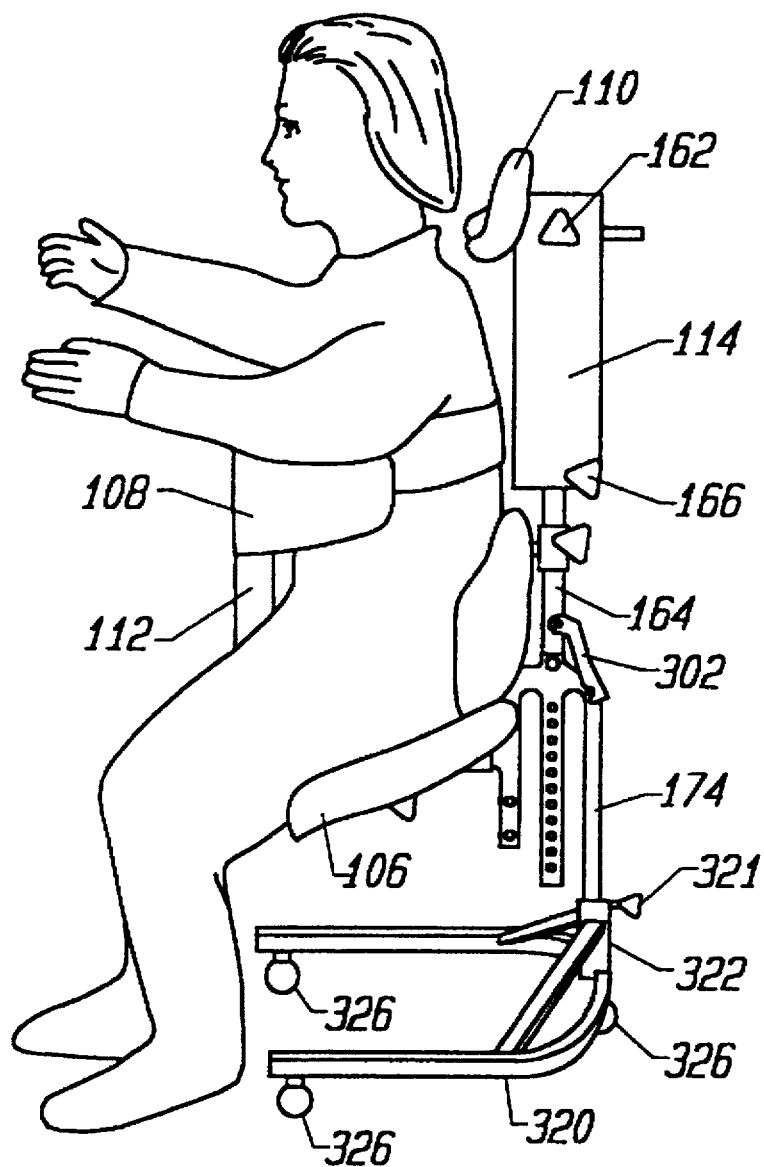
FIG. 9 is a perspective view of another embodiment of the present invention.

FIG. 9 is a perspective view of another embodiment of the present invention. In this embodiment, the user support frame is connected to a walker base 320. The walker base replaces the power base and allows the child user to use her legs for movement. The walker base has a walker base pole 322 which accepts pole 176 of the user support frame. The walker base pole has an inside dimension greater than the outside dimension of pole 174 so that the user support frame is capable of being moved to multiple vertical locations as described earlier. A user support frame vertical knob 324 is used to lock the user support frame in a vertical location. The walker base also has three castered free-spinning wheels 326. Although three wheels are shown, more wheels may be utilized.

As with the power base, the user support frame is connected to the walker base at only one location. This allows the numerous adjustments in the user support frame, including the head rest, lower back pad, and trunk pad, to be adjusted to suit an individual child user. After the user support frame is customized for the child user, the user support frame vertical knob is used to adjust the user support frame to support the child user in multiple positions without requiring multiple adjustments. These positions include sitting, semi-standing, and standing positions.

While the above is a complete description of specific embodiments of the invention, various modifications, alternative constructions, and equivalents may be used. For example, other support structures may utilized to provide additional support for the child user. Therefore, the above description should not be taken as limiting the scope of the invention as defined by the following claims.

What is claimed is:

1. A mobility aid providing mobility to a physically challenged child user, comprising:
 a base having wheels connected to said base;
 a main frame coupled to said base, said base supporting said main frame in a substantially vertical position and said main frame being vertically adjustable to a plurality of vertical heights,
 wherein said main frame includes
  a lower frame adjustably coupled to said base, and
  an upper frame coupled to said lower frame,
 a trunk support coupled to said lower frame;
 a seat coupled to said lower frame; and
 a back support coupled to said upper frame;
 whereby said trunk support, said seat, and said back support move vertically as a unit with said main frame in order to support the child user in a plurality of positions.

2. The mobility aid of claim 1, wherein said seat is manually movable from a forward position to support said user in a sitting position and a rearward position to support said user in a standing position.

3. The mobility aid of claim 1, wherein said upper frame is rotatably coupled to said lower frame, said upper frame movable between a first upright position supporting the child user and a second position not supporting said child user, whereby the child user may be more easily assisted into and out of the mobility aid.

4. The mobility aid of claim 1, wherein said trunk support, seat, and back support are movable with respect to each other to create a customized support for the child user, whereby said customized support moves vertically as a unit with said main frame.

5. The mobility aid of claim 1, wherein said back support includes a lower back pad coupled to said upper frame and a head rest coupled to said upper frame above said lower back pad.

6. The mobility aid of claim 1, wherein said main frame includes at least one vertical pole.

7. The mobility aid of claim 1, wherein said base is a power base including a motor mounted on said power base and coupled to said wheels.

8. The mobility aid of claim 7, further comprising a user-operable input device electrically coupled to said power base.

9. The mobility aid of claim 8, wherein said input device is a joystick.

10. The mobility aid of claim 8, wherein said input device is a joystick.

11. The mobility aid of claim 8, further comprising an adjustable arm coupled to said input device and said main frame, said adjustable arm allowing said input device to be positioned in a plurality of locations.

12. The mobility aid of claim 7, further comprising a knee support coupled to said main frame.

13. The mobility aid of claim 7, further comprising a foot support coupled to said main frame.

14. The mobility aid of claim 1, wherein said base is a walker base having free-spinning wheels.

15. A power mobility aid providing mobility to a physically challenged child user, comprising:
 a power base having a motor mounted on said power base and wheels coupled to said motor;
 a main frame including a lower frame and an upper frame, said lower frame being coupled to said power base;
 said upper frame being rotatably coupled to said lower frame, said upper frame being rotatable between a first upright position supporting the child user and a second, non-upright position not supporting the child user, whereby the child user may be more easily assisted into and out of the power mobility aid;
 a trunk support coupled to said lower frame;
 a seat coupled to said lower frame; and
 a back support coupled to said upper frame.

16. The power mobility aid of claim 15, wherein said back support includes a lower back pad coupled to said upper frame and a head rest coupled to said upper frame above said lower back pad.

17. The power mobility aid of claim 15 further comprising:

a user-operable input device electrically coupled to said power base; and an adjustable arm coupled to said input device and said main frame, said adjustable arm allowing said input device to be positioned in a plurality of locations.

18. The power mobility aid of claim 17, wherein said plurality of locations includes behind the child user's head.

19. The power mobility aid of claim 17, wherein said input device is a joystick.

20. The power mobility aid of claim 17, wherein said input device includes a plurality of switches coupled to said input device.

* * * * *